United States Patent
Lowrey

(10) Patent No.: US 10,036,418 B2
(45) Date of Patent: Jul. 31, 2018

(54) LOCKING HINGES

(71) Applicant: Lift Link Housing Pty Ltd., New South Wales (AU)

(72) Inventor: Ian Lowrey, New South Wales (AU)

(73) Assignee: Lift Link Housing Pty Ltd. (AU)

( * ) Notice: Subject to any disclaimer, the term of this patent is extended or adjusted under 35 U.S.C. 154(b) by 0 days.

(21) Appl. No.: 15/327,513

(22) PCT Filed: Jul. 22, 2014

(86) PCT No.: PCT/AU2014/050141
§ 371 (c)(1),
(2) Date: Jan. 19, 2017

(87) PCT Pub. No.: WO2015/013757
PCT Pub. Date: Feb. 5, 2015

(65) Prior Publication Data
US 2017/0146055 A1    May 25, 2017

(30) Foreign Application Priority Data
Jul. 29, 2013   (AU) ................................ 2013902791

(51) Int. Cl.
*E05D 11/10* (2006.01)
*F16C 11/10* (2006.01)
(Continued)

(52) U.S. Cl.
CPC .............. *F16C 11/10* (2013.01); *E04B 1/344* (2013.01); *E04C 3/005* (2013.01)

(58) Field of Classification Search
CPC ............. Y10T 16/5404; Y10T 16/5385; Y10T 16/5402; Y10T 16/5409; Y10T 16/54026;
(Continued)

(56) References Cited

U.S. PATENT DOCUMENTS 1,180,965 A * 4/1916 Baly ....................... F16C 11/10
297/54
1,639,009 A * 8/1927 Singley .................. A47B 91/00
182/163
(Continued)

FOREIGN PATENT DOCUMENTS

FR          1138890 A  *  1/1969 ......... E05D 11/1014
WO    2003029581 A2      4/2003
WO    2013044301 A1      4/2013

OTHER PUBLICATIONS

Australian Patent Office, International Search Report and the Written Opinion of the International Searching Authority, dated Oct. 8, 2014, for PCT/AU2014/050141.
(Continued)

*Primary Examiner* — Chuck Y Mah
(74) *Attorney, Agent, or Firm* — Design IP

(57) ABSTRACT

A locking mechanism (10) for a hinge (4) is disclosed. A latch member (11) engages with a lip (12). A positive drive means (20, 23, 24, 41) enables the latch member to be driven into and out of engagement with the lip. The driven engagement when the hinge is used in relation to columns (1, 101) prevents small movements at the hinge being magnified into large movements at the end of the column members. The driven dis-engagement enables the hinge to be opened notwithstanding mechanical loads, corrosion, insect nests and similar obstacles. The drive means preferably takes two forms, namely threaded fasteners (20, 23, 24) and a spring loaded rotatable actuator (41) with ramped surfaces (48, 49) which male with ramped surfaces (61, 62) on the latch member (11).

18 Claims, 9 Drawing Sheets

(51) Int. Cl.
*E04B 1/344* (2006.01)
*E04C 3/00* (2006.01)

(58) Field of Classification Search
CPC ....... Y10T 16/540247; Y10T 16/54025; Y10T 16/528; Y10T 16/5275; Y10T 403/32409; Y10T 403/32324; Y10T 403/32352; F16C 11/10; F16C 11/12; E04B 1/344; E04B 1/3441; E04C 3/005; E05D 11/1007; B62B 2205/20; E04H 15/48
See application file for complete search history.

(56) References Cited

U.S. PATENT DOCUMENTS

| | | | | |
|---|---|---|---|---|
| 1,731,512 A * | 10/1929 | Verburg | ................... | B25G 1/06 |
| | | | | 403/327 |
| 2,580,117 A * | 12/1951 | McMackin | ............ | G01C 15/06 |
| | | | | 33/293 |
| 3,801,208 A * | 4/1974 | Bourgraf | ................ | A61G 1/003 |
| | | | | 403/102 |
| 4,007,557 A * | 2/1977 | Davis | ...................... | E05D 15/54 |
| | | | | 49/139 |
| 4,111,217 A * | 9/1978 | Victor | ..................... | E04H 15/60 |
| | | | | 135/114 |
| 4,286,353 A | 9/1981 | Roche | | |
| 4,736,490 A * | 4/1988 | Wesselski | .............. | B64G 1/641 |
| | | | | 16/292 |
| 4,914,783 A * | 4/1990 | Jackson | ................... | B64C 1/14 |
| | | | | 16/363 |
| 4,941,695 A * | 7/1990 | Miller | ...................... | F16J 13/24 |
| | | | | 292/256.5 |
| 5,044,044 A * | 9/1991 | Young | ...................... | A63C 5/02 |
| | | | | 16/323 |
| 5,340,065 A * | 8/1994 | Thomas | .................... | G09F 7/20 |
| | | | | 248/150 |
| 5,441,359 A | 8/1995 | Filippi | | |
| 5,681,045 A * | 10/1997 | Liao | ..................... | A63B 63/004 |
| | | | | 273/400 |
| 5,685,660 A * | 11/1997 | Liao | .................... | E05D 11/1007 |
| | | | | 384/585 |
| 7,003,849 B2 * | 2/2006 | Cohen | .................. | A63C 11/221 |
| | | | | 16/232 |
| 7,029,197 B2 * | 4/2006 | Lin | ......................... | F16B 2/185 |
| | | | | 285/70 |
| 8,246,014 B2 * | 8/2012 | Jien | .......................... | B63B 17/04 |
| | | | | 256/59 |
| 8,365,450 B1 * | 2/2013 | Redmon | ................ | G03B 21/58 |
| | | | | 248/170 |
| 8,876,062 B1 * | 11/2014 | Baghdasarian | ........ | B64G 1/222 |
| | | | | 16/231 |
| 2009/0193619 A1 * | 8/2009 | Irwin | ........................ | E05F 3/20 |
| | | | | 16/274 |
| 2012/0042474 A1 * | 2/2012 | Kachtan | ................ | E05C 17/025 |
| | | | | 16/350 |

OTHER PUBLICATIONS

European Patent Office, International Search Report and Written Opinion of the International Searching Authority, dated Jul. 7, 2017, for PCT/AU2014/050141.

* cited by examiner

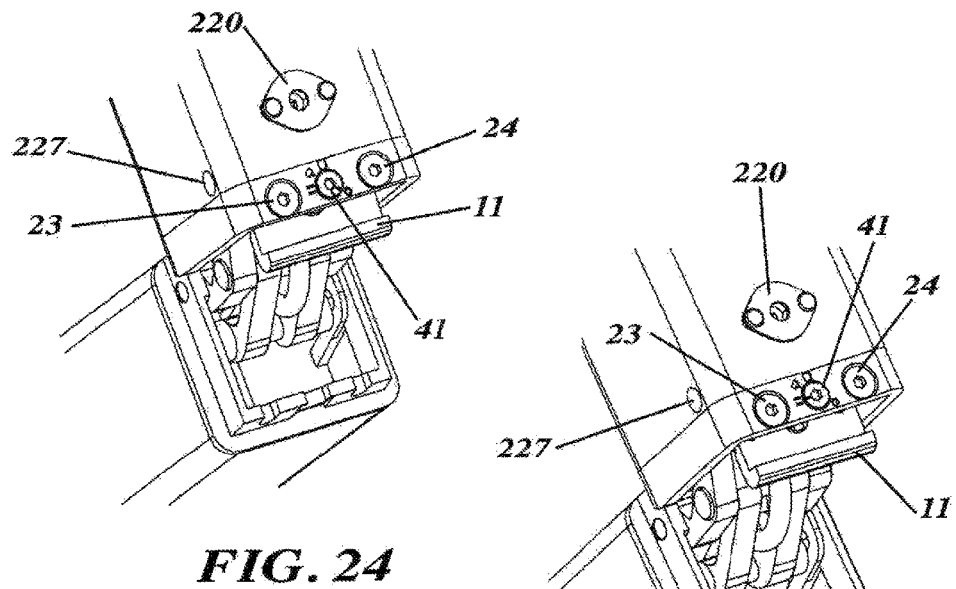
FIG. 24
FIG. 25
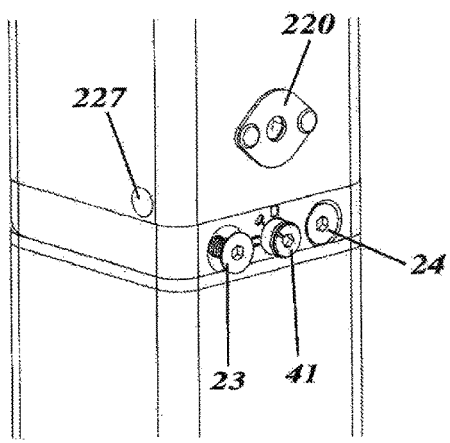
FIG. 26
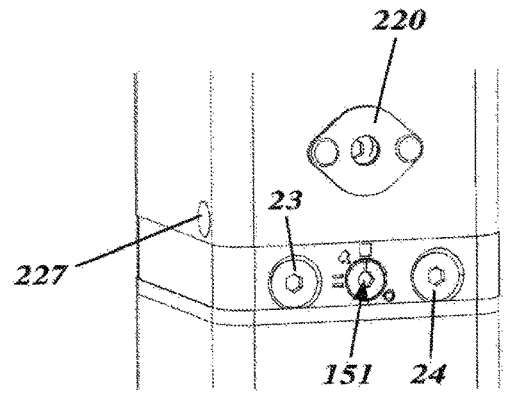
FIG. 27

LOCKING HINGES

FIELD OF THE INVENTION

The present invention relates to modular housing and in particular, to housing formed from modules which can be repeatedly transported to a location, erected (or raised) at that location, lowered, and then transported to another location.

BACKGROUND ART

Two published international patent applications namely WO2011/120057 and WO2013/044301 disclose such modules but have not, as of the priority date of the present application, been erected or constructed. The contents of both international applications are hereby incorporated into the present specification for all purposes.

A repeatedly erectable module which has four columns is disclosed in the abovementioned patent specifications. Each column is located at a corresponding corner of the module. Each column is provided with a roof hinge, a central hinge, and a floor hinge. Thus each column has three hinges. The columns fold between an initial transport configuration and an erected configuration. In the transport configuration the two main portions of the column lie alongside each other. In the erected configuration all the portions of the column are substantially aligned. Each of the hinges preferably includes two parts which overlap when the portions of the column are aligned.

In order to maintain the column portions in an aligned condition, a fastener has been intended to pass through the overlapping portions of the hinge. In a typical proposed arrangement the fastener would have a threaded shank which mates with a threaded orifice in one of the overlapping portions.

Various disadvantages are associated with this proposed method of maintaining the column portions aligned. Firstly, it takes some time to screw in each of the fasteners during the erection phase, and subsequently unscrew the fasteners if the module is to be moved. In addition, during the move the fasteners may well be lost. Thirdly, where the fasteners are provided with a conventional head such as a Phillips screw head or a slotted head, pranksters or malicious malcontents may undo the fasteners.

Furthermore, during the erection procedure it is desirable that personnel not enter the structure until the columns have been reliably placed in their erected condition and the hinges prevented from bending or otherwise giving way. Still further, during the lowering procedure, the weight carried by the columns, corrosion, and various other factors may prevent the threaded fastener being undone. Finally, it is desirable that the hinges be latched or locked into their erected position without any give since a fraction of a millimetre movement at the hinge translates into many millimetres of movement or slack at the end of the column portions.

GENESIS OF THE INVENTION

The genesis of the present invention is a desire to provide an improved releasable lock and thereby improve the arrangements for fastening such hinge columns.

SUMMARY OF THE INVENTION

In accordance with a first aspect of the present invention there is disclosed an interior locking mechanism for a hollow column having at least two portions which are hinged together, said mechanism comprising:
an interior lip on one of two hinge members able to be mounted on one of said column portions,
a latch member pivoted to the other of said hinge members, said other hinge member being able to be mounted on the other of said column portions,
a hinge means interconnecting said two hinge members,
said latch member having a rounded head able to be displaced in a first direction from a rest position to permit said lip to move past said head,
biasing means to urge said latch member in a second direction opposite to said first direction, and
a positive drive means interconnecting said latch member and said other hinge member and operable to drive said latch in said second direction to force said latch member into abutting engagement with said lip to lock said hinge members together, and operable to drive said latch in said first direction to release said lock.

In accordance with a second aspect of the present invention there is disclosed a method of ensuring re-opening of a hinge latch mechanism, said method comprising the steps of:
providing a locking lip on a first hinge member,
pivoting a latch member on a second hinge member to be pivotable between two positions, a first position free of said locking lip and a second position engaged with said locking lip, and
interconnecting said first hinge member and said latch member with a positive drive means operable to drive said latch member in a first direction to release said latch member from said locking lip, and in a second direction to force said latch member into abutting engagement with said locking lip.

Preferably the method includes the further steps of:
providing a threaded shaft which passes freely through, and is rotatably mounted in, an aperture in said second hinge member,
providing a threaded orifice in said latch member,
threadably engaging said threaded shaft with said threaded orifice, and
rotating said threaded shaft in either one of two opposite directions to respectably urge said latch member into, or out of, engagement with said locking lip.

BRIEF DESCRIPTION OF THE DRAWINGS

Three embodiments of the present invention will now be described with reference to the accompanying drawings in which:

FIG. 24 is a perspective view of the hinge of the third embodiment with the locking mechanism set in the start position, FIG. 25 is a perspective view of the hinge of FIG. 24 with the locking mechanism said in the unlatched position, FIG. 26 is a perspective view of the hinge of FIGS. 24 and 25 in the closed but unlatched position, FIG. 27 is a perspective view of the hinge of FIGS. 24-26 in the latched and locked position.

DETAILED DESCRIPTION

Figure 1:
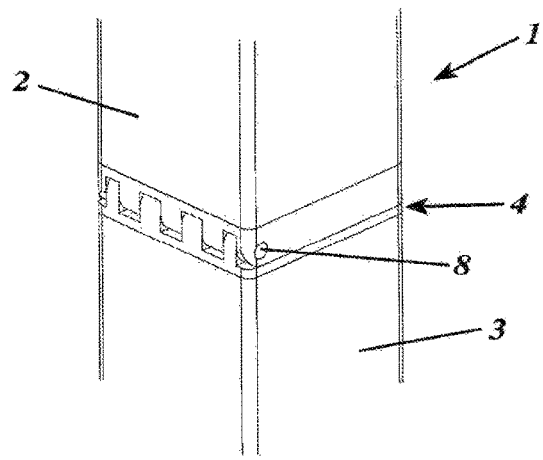
FIG. 1 is a perspective view of a column provided with a hinge movable through 90° and illustrated in an aligned condition, the view being from the rear of the hinge.
Figure 2:
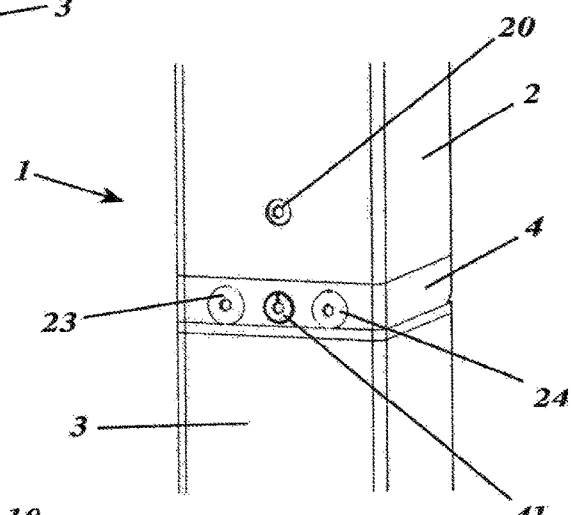
FIG. 2 is a perspective view of the column of FIG. 1 but viewed from the front of the hinge.
Figure 3:
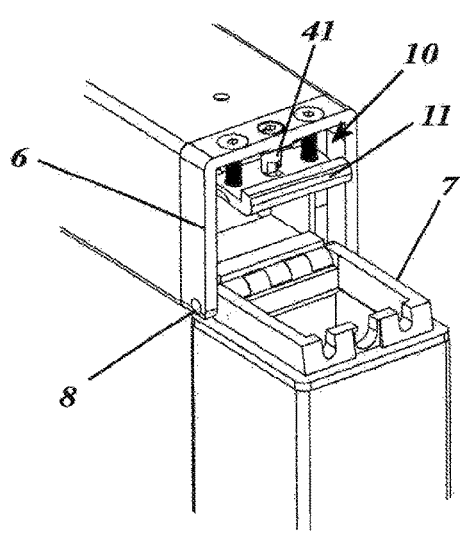
FIG. 3 is a perspective view of the column of FIG. 2 showing the hinge fully open.
Figure 4:
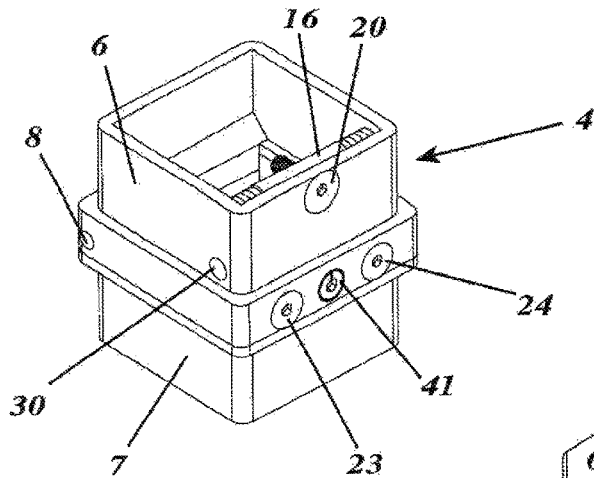
FIG. 4 is a perspective view of the hinge prior to its insertion into the tubular members which form the column.
Figure 8:
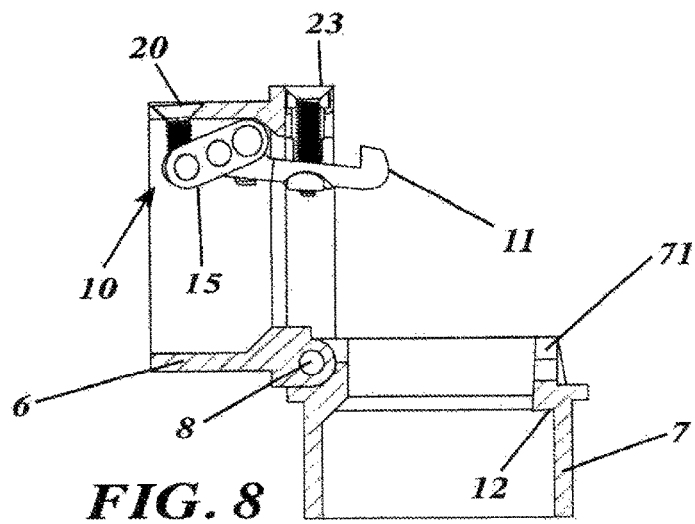
FIG. 8 is a cross-sectional view taken vertically through the hinge of FIG. 3 and showing the hinge open.
Figure 10:
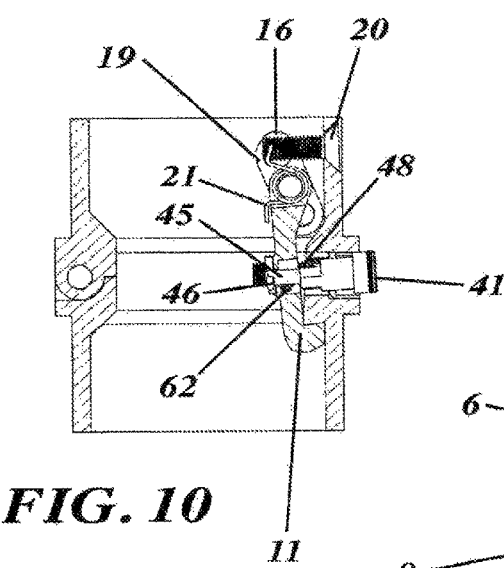
FIG. 10 is a view similar to FIG. 9 but showing a further intermediate stage in the locking of the hinge, and with the latch member being illustrated in cross-section.
Figure 11:
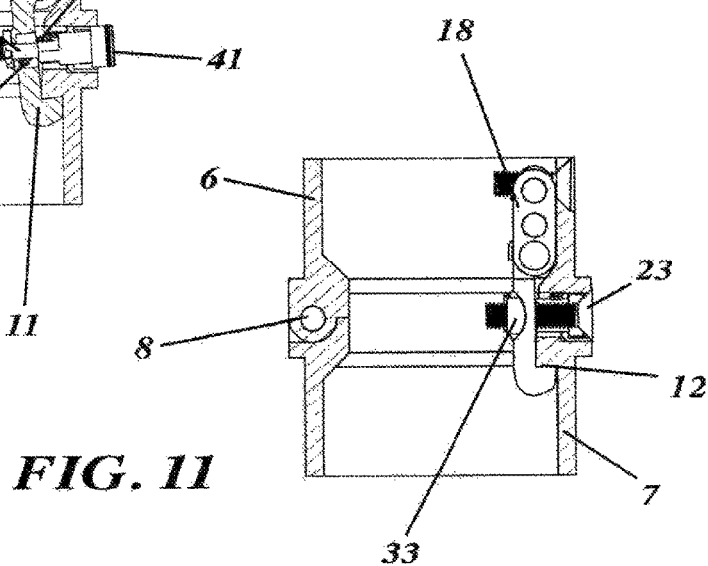
FIG. 11 is a view similar to FIGS. 8-9 but showing the hinge in its locked condition.

As seen in FIGS. 1 and 2 a column 1 has an upper portion 2 and a lower portion 3 which are interconnected by means of a hinge 4, as illustrated in isolation in FIG. 4. The hinge 4 has an upper housing 6 and a lower housing 7 which are interconnected by means of a pin 8. A locking mechanism 10 including an L-shaped latch member 11 is mounted within the upper housing 6 as illustrated in FIG. 3. As best seen in FIG. 8, the lower housing 7 has an interior locking lip 12 with which the latch member 11 can engage as seen in FIGS. 10 and 11.

Figure 12:
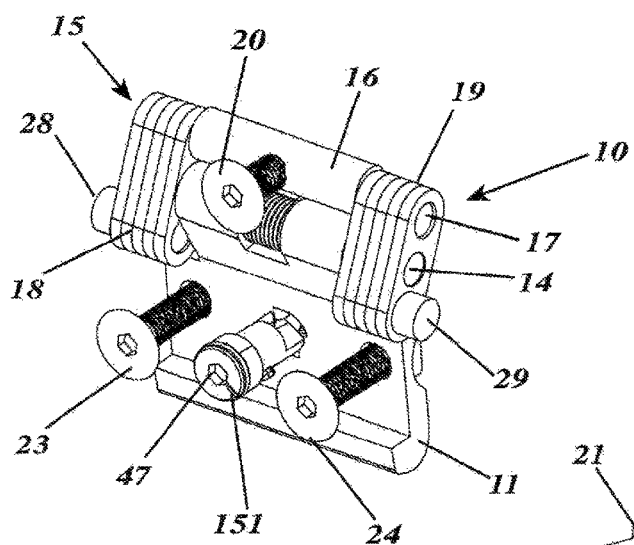
FIG. 12 a front perspective view of the locking mechanism of the hinge.
Figure 13:
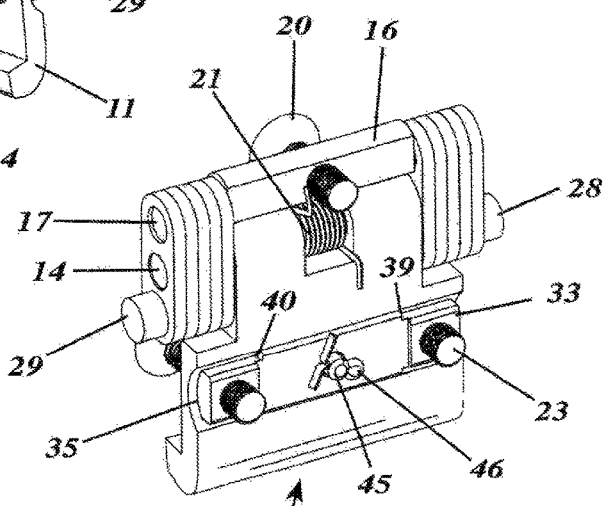
FIG. 13 is a rear perspective view of the locking mechanism of FIG. 11.

Turning to FIGS. 12 and 13, the locking mechanism 10 has a central axle 14 on which a pair of shoulders 15 are pivoted. The shoulders 15 have a centrally located cylindrical yoke 16 which has two protruding pins 17 which function as pivot points. In addition, the shoulders 15 include two arms 18, 19 each of which carries a corresponding stub axle 28, 29. The stub axles 28, 29 are retained in apertures 30 in the upper housing 6 as best seen in FIG. 4 in relation to stub axle 28.

As best seen in FIG. 13, the central axle 14 has a spring 21 located thereon which is wound, tensioned and arranged to urge both the arms 18, 19 anticlockwise as seen in FIG. 8 and to also urge the free end of the latch member 11 towards the locking lip 12. A fastener 20 passes through the yoke 16 and also through a frusto-conical opening 26 (FIG. 6) in the upper housing 6 of the hinge 4.

Figure 6:
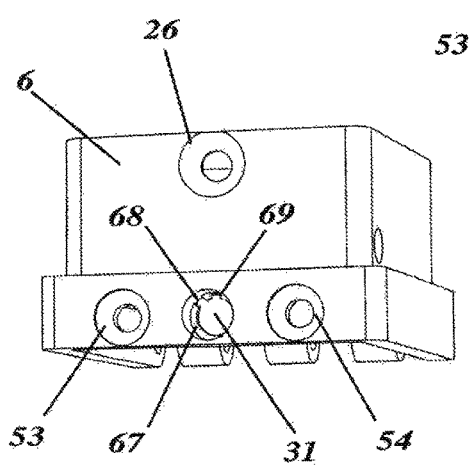
FIG. 6 is a perspective view of the front of the upper portion of the hinge of FIG. 4.
Figure 14:
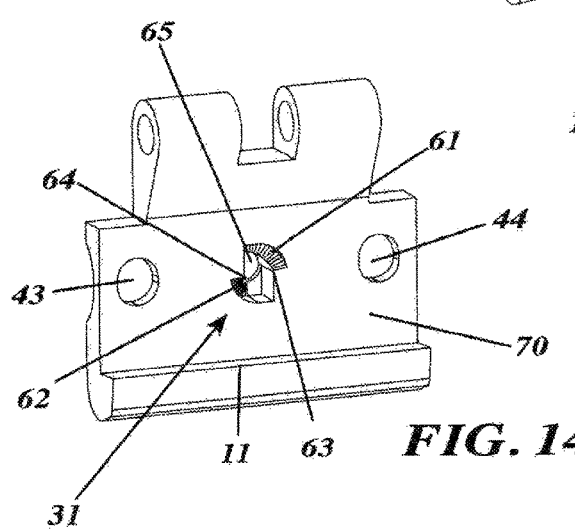
FIG. 14 is a front perspective view of the latch member of the locking mechanism.
Figure 15:
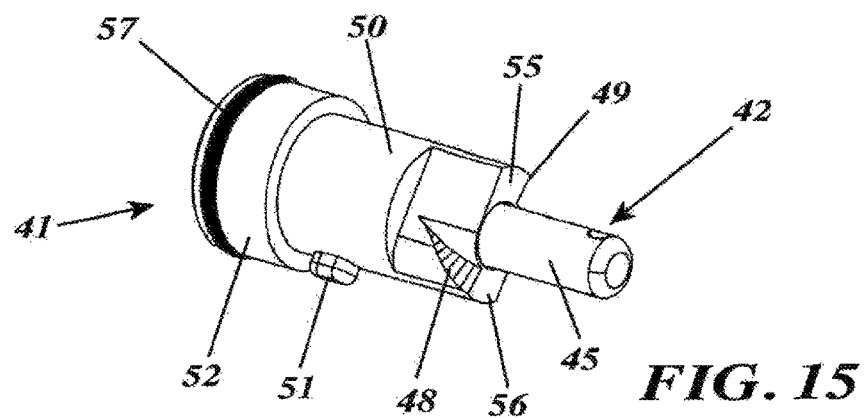
FIG. 15 is a perspective view of an actuator which actuates the locking mechanism.
Figure 16:
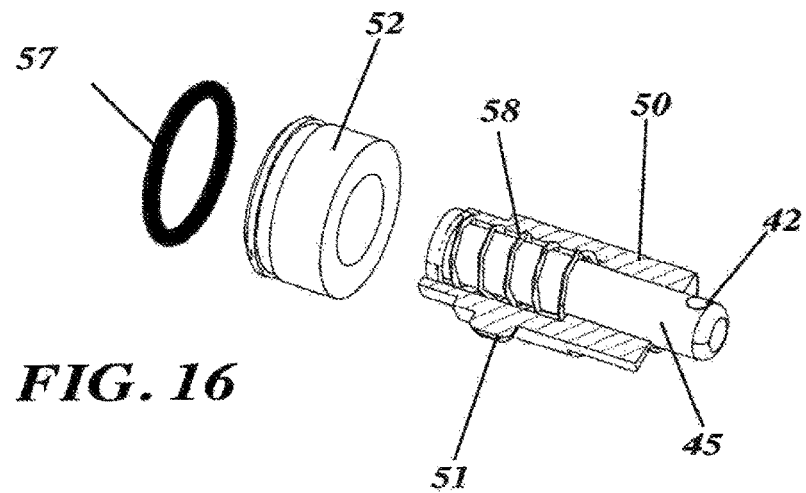
FIG. 16 is an exploded perspective view of the actuator of FIG. 14 with the central body of the actuator shown in cross-section.
Figure 17:
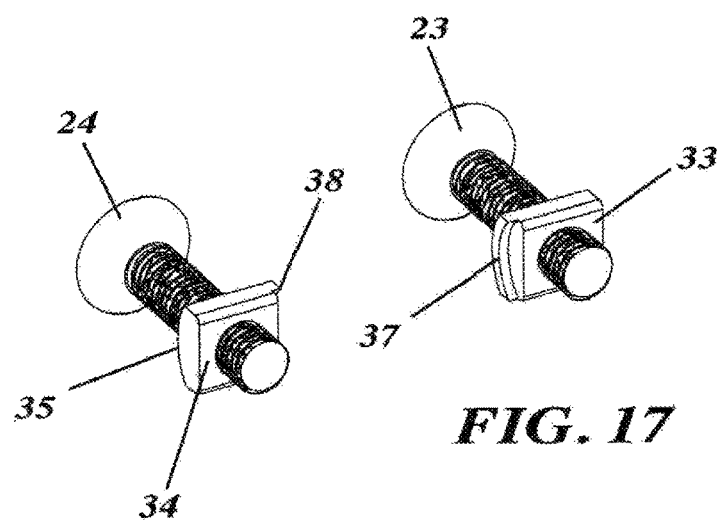
FIG. 17 is a perspective view of two threaded fasteners included within the locking mechanism of FIGS. 12 and 13.
Figure 18:
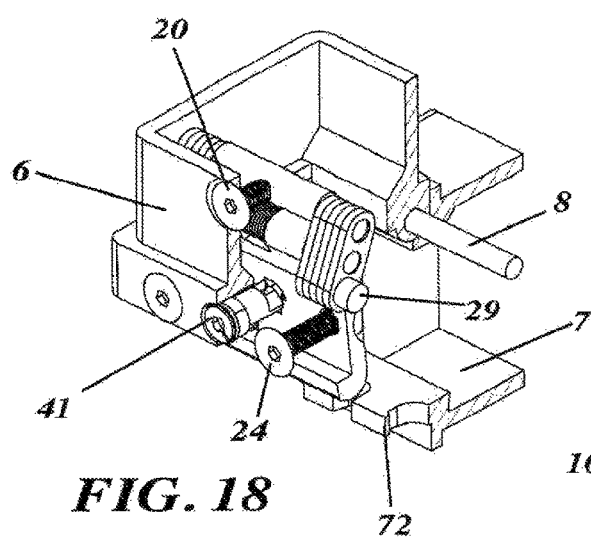
FIG. 18 is a cutaway perspective view showing the interior of the hinge.
Figure 19:
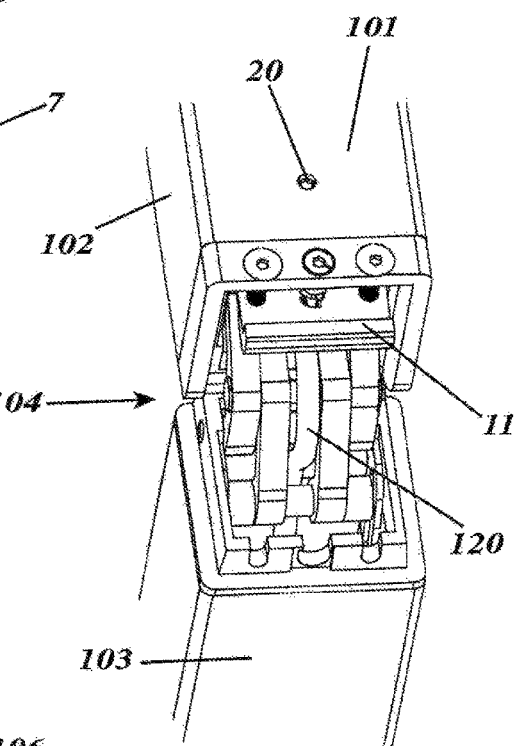
FIG. 19 is a perspective view of a hinge of a second embodiment which is capable of movement through 180°, the column within which the hinge is installed being only partially opened, being fitted with an electrical cable, and being provided with the same locking mechanism as the hinge of the first embodiment.
Figure 20:
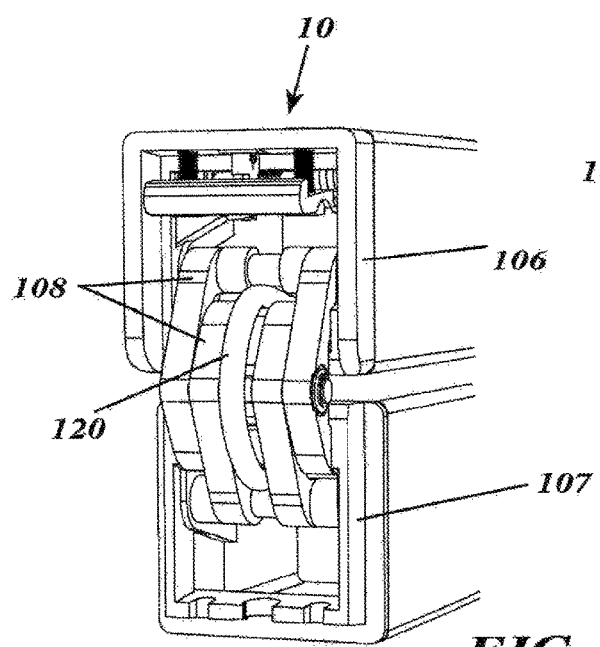
FIG. 20 is a view of the hinge and column of FIG. 19 with the hinge being fully opened to 180°.
Figure 21:
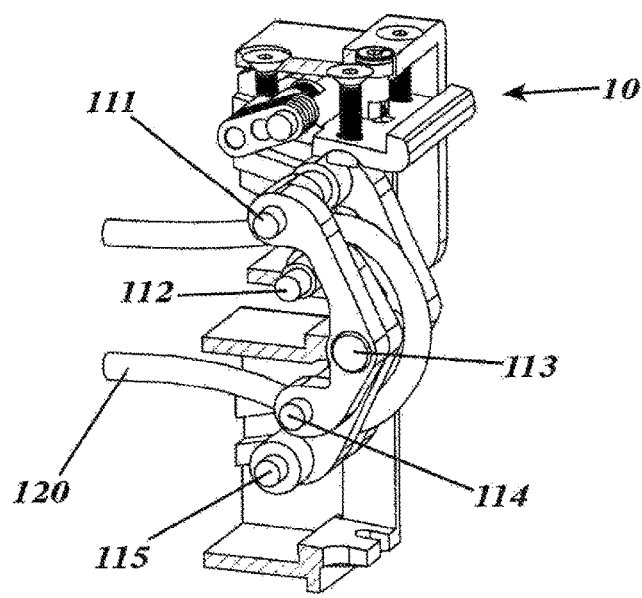
FIG. 21 is a cutaway perspective view showing the interior of the hinge of FIGS. 19 and 20.
Figure 22:
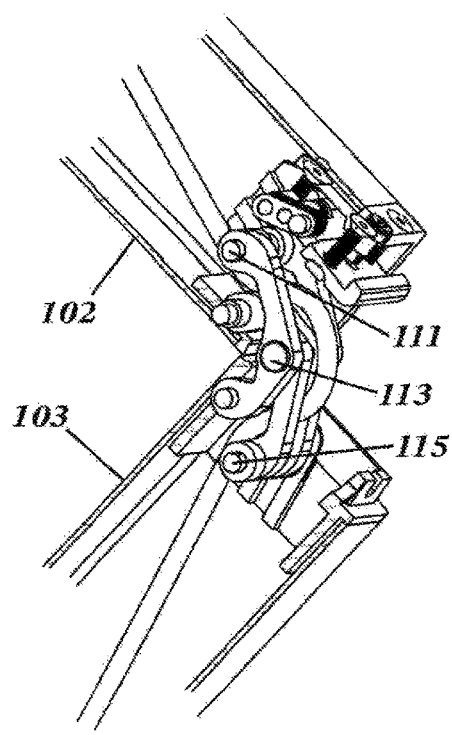
FIG. 22 is a cutaway perspective view showing the hinge in its partially closed position.
Figure 23:
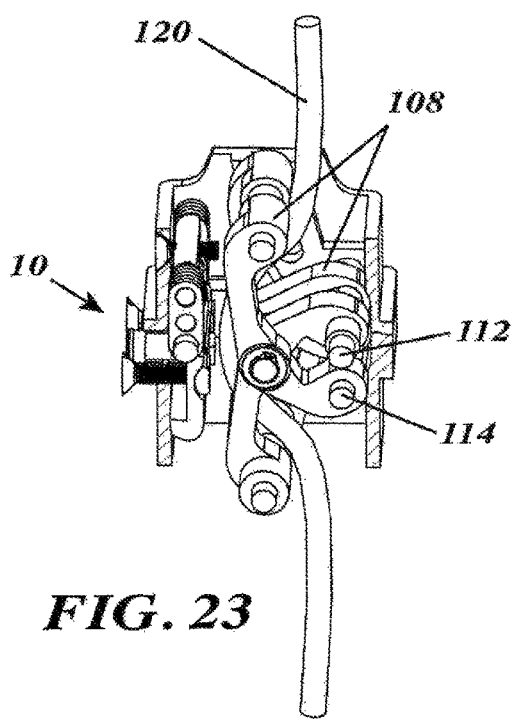
FIG. 23 is a cutaway perspective view showing the hinge in the fully closed position.

In addition, the latch member 11 is provided with two fasteners 23, 24 each of which has a threaded shank which is engaged with a corresponding nut 33, 34 having a curved proximal surface 35 (as best seen in FIGS. 13 and 17). In addition each nut 33, 34 is provided with an arcuate ridge 37, 38 (FIG. 17) which mates with a corresponding one of a pair of arcuate grooves 39, 40 (FIG. 13) on the latch member 11. The shanks of the fasteners 23, 24 pass through corresponding openings 43, 44 in the latch member 11 (as best seen in FIG. 14) and through frusto-conical openings 53, 54 in the upper housing 6 (as best seen in FIG. 6). In addition, the latch member 11 is provided with a central opening 31 (FIG. 14) in which is received an actuator 41 as illustrated in FIGS. 15 and 16. The distal end of the actuator 41 has a through hole 42 through which a cotter pin 46 passes, as seen in FIG. 13, in order to retain the actuator 41 in the central opening 31.

Figure 5:
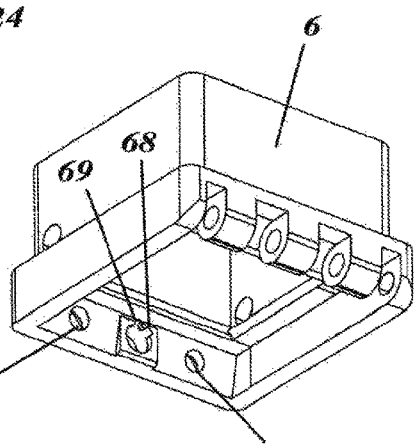
FIG. 5 is a perspective view of the rear of the upper portion of the hinge of FIG. 4.
Figure 7:
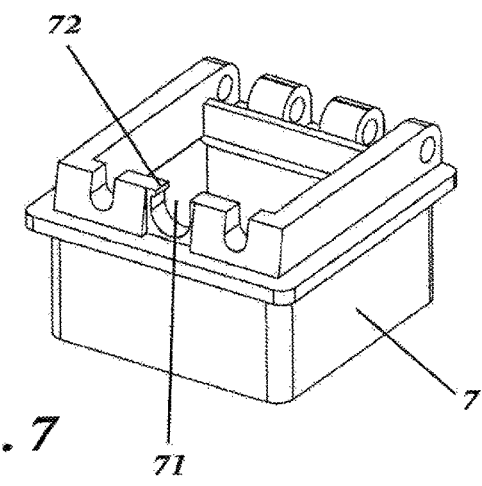
FIG. 7 is a perspective view of the front of the lower portion of the hinge of FIG. 4.

As best seen in FIG. 14, the central opening 31 is provided with two curved partially spiral surfaces 61, 62 and two corners 63, 64 as well as a circular opening 65. The circular opening 65 forms a bearing for the distal end of the actuator 41 which includes the through hole 42 for the cotter pin 46. Furthermore, as best seen In FIGS. 5 and 6, the central opening 31 is provided with a part circular rim 67 having two gaps 68 and 69. In addition, opposite the central opening 31 on the lower housing 7 is a U-shaped bite 71 which has a trip lip 72 (FIG. 7).

As seen in FIGS. 15 and 16, the actuator 41 has a body 50 which is provided with two ramped spiral surfaces 48, 49. These mate with the curved spiral surfaces 61, 62 of the central opening 31. In addition, the actuator 41 is provided with two flat ends 55, 56. Furthermore, the actuator body 50 includes a lug 51 and is press fitted into a cylindrical boss 52 having an O-ring 57.

The distal end of the actuator 41 takes the form of an actuator pin 45 reciprocally mounted within the actuator body 50. The distal end of the actuator pin 45 is provided with the through hole 42. An internal spring 58 urges the actuator pin 45 to the left as seen in FIGS. 15 and 16. In FIG. 15 the actuator pin 45 is illustrated extended from the actuator body 50 which corresponds with the position of the actuator 41 illustrated in FIG. 12. In FIG. 16 the actuator pin 45 is illustrated in its rest position which corresponds to the position of the actuator 41 illustrated in FIG. 11. As best seen in FIG. 12, the boss 52 of the actuator 41 is provided with a hexagonal drive recess 47 and a marker groove 151 which is aligned with the lug 51.

During the erection procedure, the hinge 4 is initially in the position illustrated in FIG. 8 where the fastener 20 has been rotated so as to move the shoulders 15 into the position illustrated in FIG. 8. Furthermore, the fasteners 23, 24 have been rotated relative to the nuts 33, 34 so that the free end of the latch member 11 is moved towards the interior of the column 1. In addition, the actuator 41 is turned so that the marker groove 151 is approximately in a "9 o'clock" position as seen, for example, in FIG. 3. These actions, in effect, prime the hinge for its initial operation.

Figure 9:
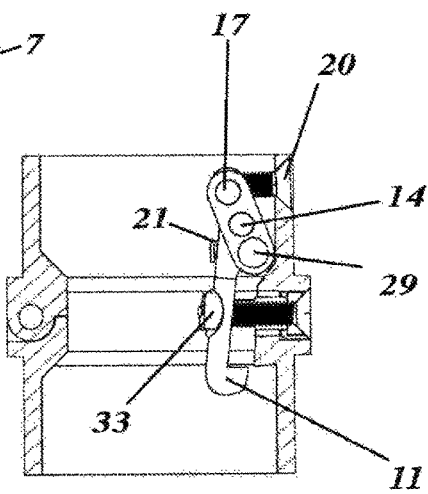
FIG. 9 is a view similar to FIG. 8 but showing an intermediate stage in the locking of the hinge.

As the two portions of the column 1 are moved together as the hinge closes, the locking mechanism 10 is initially moved into the position illustrated in FIG. 9, and if necessary, the rounded head of the latch member 11 passes over the interior rim of the lower housing 7. The trip lip 72 pushes the lug 51 in a clockwise direction as seen in FIG. 12, for example, so that the lug 51 is moved into approximately the "10 o'clock" position. In this position the lug 51 becomes aligned with the gap 68 which enables the actuator 41 to be driven forwardly by the spring 21 as the latch member 11 moves to engage the locking lip 12. This places the latch member 11 into the position illustrated in FIG. 10 in which it will be seen that the boss 52 of the actuator 41 protrudes outwardly.

Thereafter, the fasteners 20, 23 and 24 are all screwed inwardly. This draws the shoulders 15 and latch member 11 into the locked position illustrated in FIG. 11, if they have not already been driven there by the spring 21. In either event, the latch member 11 is locked into the latched position. In particular, this positive locking eliminates any play between the two housings 6, 7 of the hinge and therefore eliminates any play between the two portions 2, 3 of the column 1.

It will be apparent from FIGS. 5 and 6, and FIGS. 12-18 that the actuator 41 interacts with the L-shaped latch member 11 as follows. The internal spring 58 urges the actuator 41 to the left as seen in FIG. 15. As a consequence, if the lug 51 is aligned with gaps 68 in the rim 67, then the boss 52 of the actuator 41 will protrude from the upper housing 6 if the latch member 11 is engaged with the locking lip 12. The cotter pin 46 prevents the actuator 41 from coming out of the hinge 4 altogether.

In this position, the boss 52 provides a visible indication that the latch member 11 is engaged with the locking lip 12 which is important because neither the latch member 11 nor the locking lip 12 are visible to persons erecting the structure since they are hidden within the interior of the column 1. As a consequence, during the erection of the structure, as the roof is raised, the hinges 4 snap shut and each boss 52 can be seen protruding from the corresponding hinge 4 which thereby provides a visual (and to some extent aural) indication to personnel erecting the structure that it is safe to enter and that the erected columns have been latched as desired. Thereafter the fasteners 20, 23, 24 can be manipulated as described above to positively lock the latch member 11 against the locking lip 12 and eliminate any play between the two portions 2, 3 of the column 1. Next, the actuator 21 can be turned slightly clockwise so as to align the marker groove 151 with the gap 69. The lug 51 can then pass through the gap 69 so as to return the boss 52 to position substantially flush with the upper housing 6. This is the situation illustrated in FIG. 11.

In the event that it is necessary to lower the structure of which the column 1 is a part, the fasteners 20, 23 and 24 are turned so as to drive the free end of the latch member 11 in a clockwise direction as seen in FIG. 11 with the intention of placing the latch member 11 into the position illustrated in FIG. 9. However, because of the mechanical load on the column 1 this intended rotation of the latch member 11 may not take place. Thus, instead of the heads of the fasteners 23, 24 remaining flush with the housing 6, 7, and the latch member 11 being pushed out of engagement with the locking lip 12, these fastener heads may protrude from the hinge 4, in which case the latch member 11 remains in its fully latched position. In this connection, it should be noted that the head of the fastener 20 is captive between the upper housing 6 and the upper portion to the column 1. This is simply arranged by ensuring that the opening in the upper portion 2 which allows access to the head of the fastener 20, is slightly smaller in diameter than the outer diameter of the head of the fastener 20.

In order to counteract this "sticking" situation, the actuator 41 is rotated so that the ramp spiral surfaces 48, 49 on the actuator 41 ride over the curved spiral surfaces 61, 62 on the latch member 11. As a consequence, the flat ends 55, 56 move out of the central opening 31 and bear on the front surface 70 (as illustrated in FIG. 14) of the latch member 11. In this position of the actuator 41, the lug 51 moves to the inside of the rim 67. Continued rotation of the actuator 41 means that the engaged spiral surfaces 48, 49, 61 and 62 moves the actuator 41 towards the latch member 11. This urges the latch member 11 out of engagement with the locking lip 12 and into the position illustrated in FIG. 9. In this position the heads of the fasteners 23, 24 are flush with the outer surface of the hinge.

In the unlikely event that the latch member 11 is stuck against the locking lip 12 because of corrosion, the presence of nests of insects, and other such unlikely occurrences, then the rotation of the fastest 23, 24 will drive the heads of the fasteners 23, 24 out of the flush position illustrated in FIG. 11 the proud heads of the fastest 23, 24 can then be struck with a hammer so as to forcibly drive the latch member 11 out of engagement with the locking lip 12 and into the unlatched position illustrated in FIG. 9.

Once the latch member 11 is so positioned, the hinge 4 can then be rotated through 90° so as to place it in the condition illustrated in FIG. 8. After the hinge has been opened, the actuator 41 is preferably turned by the operator so as to place the marker groove 151 in the "4 o'clock" position illustrated in FIG. 12. This ensures that the latch mechanism always stays open even during transport. Before the next roof erection or raising, the actuator 41 is turned so that the marker groove 151 is in the "9 o'clock" marker groove position. This action primes the latch and places it in its initial condition prior to operation.

Turning now to FIGS. 19-23, a hinge 104 of the second embodiment is illustrated for a column 101 having two portions 102 and 103. The hinge 104 is capable of being bent through 180°, not merely 90° as in the case of the hinge 4 of the first embodiment. In order to provide for the extra opening range, the pin 8 of the first embodiment is replaced by two pairs of U-shaped arms 108 which have five pins 111-115. The asymmetrical nature of the U-shaped arms 108 provides a convenient opening through which an electric cable 120 can be passed. The hinge 104 is also provided with the locking mechanism 10 as described in detail in relation to the first embodiment.

In addition, the hinges 4, 104 can be used in either orientation, up or down, since the locking action is not dependent upon gravity. Which orientation is used will often be dependent upon which orientation results in the fastener 20 being either accessible, or more accessible.

Figure 28:
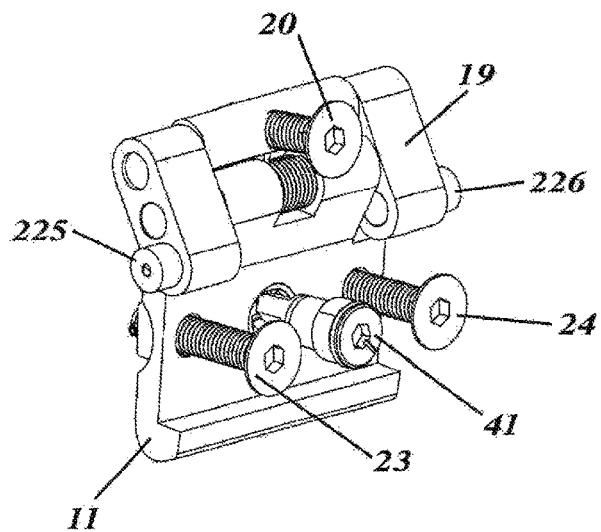
FIG. 28 is a perspective view similar to FIG. 12 but illustrating the locking mechanism of the third embodiment.
Figure 29:
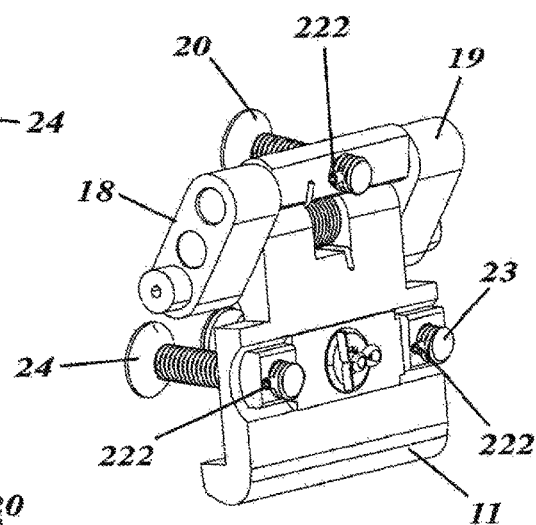
FIG. 29 is a perspective view of the reverse side of the locking mechanism of FIG. 28.
Figure 30:
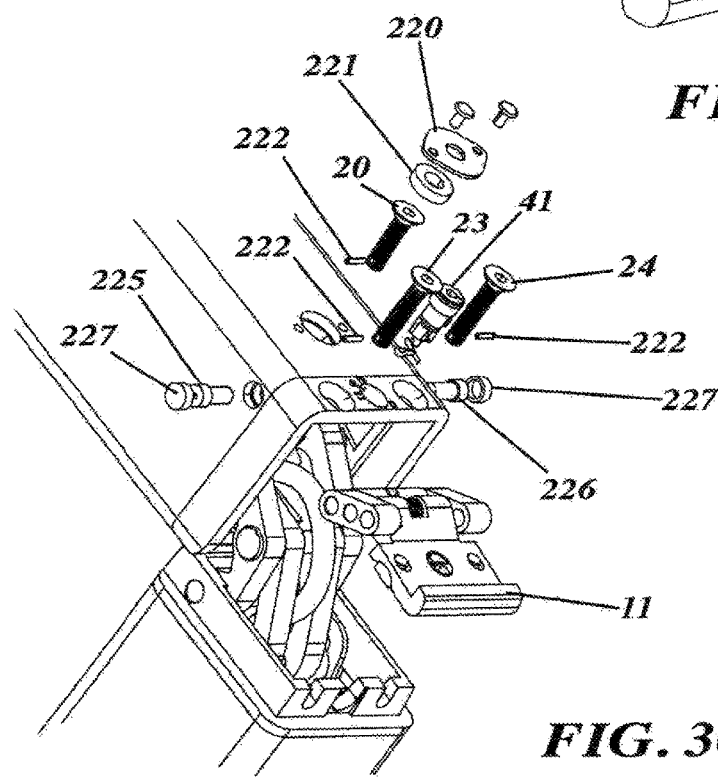
FIG. 30 is an exploded perspective view of the hinge of the third embodiment.

A third embodiment of the hinge of the present invention is illustrated in FIGS. 24-30. A particular advantage of the hinge of the third embodiment is that it enables the hinge mechanism to be easily removed from the columns. The hinge of the third embodiment differs from that of the previous embodiments in that a cover plate 220 and cylindrical spacing bush 221 are provided to ensure that the head of the fastener 20 cannot extend beyond the outer surface of the hinge. In addition, as best seen in FIG. 30, each of the fasteners 20, 23, and 24 is provided with a small hole adjacent the free end of the shank of the fastener. A roll pin 222 is inserted into each free end in order to retain the fastener within the locking mechanism. The roll pins 222 are preferably inserted (and if necessary removed) using the roll pin manipulator described in Australian Patent Application No 2014 901 521. The fasteners 20, 23 and 24 may need to be replaced in the event that their thread becomes worn.

As best seen in FIGS. 28-30, the latch is retained within the column by two pins 225, 226 each of which has a corresponding push on cap 227 which is essentially cosmetic and is intended merely to hide the head of the pins 225, 226 in the finished assembly. The pins 225, 226 are retained in the arms 18 and 19 by means of a friction fit. The pins 225, 226 are each provided with an internally threaded blind aperture which permits an extraction tool to be screwed into the pins and the pins pulled from the latch, thereby freeing the latch mechanism and allowing it to be removed In addition, as best seen in FIG. 27 the outer surface of the hinge is provided with 4 symbols at the 4 o'clock, 9 o'clock, 10 o'clock and 12 o'clock positions into which the marker groove 151 of the actuator 41 can be moved. These positions respectively correspond to the transport position the latch open position, the latch closed but unlocked position, and the latch locked position.

Once the structure has been erected, in order to lower the structure, the following sequence is followed. Firstly, the fastener 20 and the fasteners 23, 24 are backed off as far as possible and the actuator 41 is turned so that the marker groove 151 is in the 4 o'clock position. This guarantees that the latch is both open and cannot be moved. Once all the hinges are in this position, the crane can take the weight of the roof, which then enables the hinges to pivot and the columns to be moved out of the vertical condition. With the marker groove 151 in the 4 o'clock position, the structure can be transported from place to place and the latch is left in the open position until the structure is re-erected.

Prior to that re-erection taking place, the actuator 41 is rotated so that the marker groove 151 is in the 9 o'clock position meaning that the latch is open and is able to be tripped by the raising of the columns into the vertical position. Once the roof is raised and the columns become vertical, the hinges latch with an audible click and the latch mechanism moves the actuator 41 so that the marker groove 151 is in the 10 o'clock position. In this position the cylindrical boss 52 protrudes from the hinge as shown in FIG. 26. Thereafter the fasteners 20, 23 and 24 are driven home and the actuator 41 rotated so that the marker groove 51 is then in the 12 o'clock position indicating that the hinges are both latched and locked.

The foregoing describes three embodiments of the present invention and modifications, obvious to those skilled in the building arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. An interior locking mechanism for a hollow column having at least two portions which are hinged together, said mechanism comprising:
   an interior lip on one of two hinge members able to be mounted on one of said column portions,
   a latch member pivoted to the other of said hinge members, said other hinge member being able to be mounted on the other of said column portions,
   a hinge means interconnecting said two hinge members,
   said latch member having a rounded head able to be displaced in a first direction from a rest position to permit said lip to move past said head,
   biasing means to urge said latch member in a second direction opposite to said first direction, and
   a positive rotatable drive means interconnecting said latch member and said other hinge member and to rotatably drive said latch in said second direction to force said latch member into abutting engagement with said lip to lock said hinge members together, and to rotatably drive said latch in said first direction to release said lock.

2. The mechanism as claimed in claim 1 wherein said positive rotatable drive means comprises a threaded shaft which passes freely through, and is rotatably mounted in, an aperture in said other hinge member and which is threadably engaged with an internally threaded orifice associated with said latch member.

3. The mechanism as claimed in claim 2 wherein said orifice is a threaded member which is pivotally movable relative to said latch member.

4. The mechanism as claimed in claim 3 wherein said threaded member includes a yoke which is pivoted relative to said latch member.

5. The mechanism as claimed in claim 3 wherein said threaded member includes a nut having an arcuate surface and captured by said latch member.

6. The mechanism as claimed in claim 5 wherein said threaded member has an end which protrudes beyond said other hinge member and is able to be struck by a hammer or like implement.

7. The mechanism as claimed in claim 1 wherein said latch member is pivoted relative to said other hinge member by means of an over center toggle arrangement.

8. The mechanism as claimed in claim 1, further comprising an actuator interconnecting said latch means and said other hinge member, and operable to drive said latch means out of engagement with said lip.

9. The mechanism as claimed in claim 8 wherein said latch member includes a first ramp, said actuator includes a radial lug and a second ramp, said actuator is rotatable to align said lug with a cut-out in said one hinge member and engage said ramps whereby rotation of said actuator permits said ramps to urge said latch member out of engagement with said lip.

10. The mechanism as claimed in claim 1 wherein said hinge means is rotatable through approximately 90°.

11. The mechanism as claimed in claim 1 wherein said hinge means is rotatable through approximately 180°.

12. The mechanism as claimed in claim 11 wherein a cable is able to pass said hinge means from one of said column portions to the other of said column portions.

13. A method of ensuring re-opening of a hinge latch mechanism for a first hinge member and a second hinge member, the first and second hinge members being hingedly connected to each other, said method comprising the steps of:
   providing a locking lip on the first hinge member,
   pivoting a latch member on the second hinge member to be pivotable between two positions, a first position free of said locking lip and a second position engaged with said locking lip, and
   interconnecting said first hinge member and said latch member with a positive drive means to rotatably drive said latch member in a first direction to release said latch member from said locking lip, and to rotatably drive said latch member in a second direction to force said latch member into abutting engagement with said locking lip.

14. The method as claimed in claim 13, further comprising the steps of:
providing a threaded shaft which passes freely through, and is rotatably mounted in, an aperture in said second hinge member,
providing a threaded orifice in said latch member, threadably engaging said threaded shaft with said threaded orifice, and
rotating said threaded shaft in either one of two opposite directions to respectively urge said latch member into, or out of, engagement with said locking lip.

15. The method as claimed in claim 14, further comprising the step of:
protruding an end of said threaded shaft from said first hinge member to permit said threaded member end to be struck by a hammer or like implement.

16. The method as claimed in claim 14, further comprising the steps of:
providing an actuator,
interconnecting said latch member and said first hinge member with said actuator, and
operating said actuator to drive said latch member out of engagement with said locking lip.

17. The method as claimed in claim 15, further comprising the steps of:
providing a cut-out in said first hinge member,
providing a lug on said actuator,
providing a first ramp on said latch member,
providing a second ramp on said actuator,
rotating said actuator to align said lug and said cut-out, and
longitudinally moving said actuator to engage said ramps and thereby drive said latch member out of engagement with said locking lip.

18. The method as claimed in claim 16, further comprising the step of:
providing a spring to longitudinally move said actuator.

* * * * *